Jan. 1, 1952 J. LONGWORTH 2,580,445
DEPTH OF GROOVE GAUGE
Filed Feb. 24, 1948
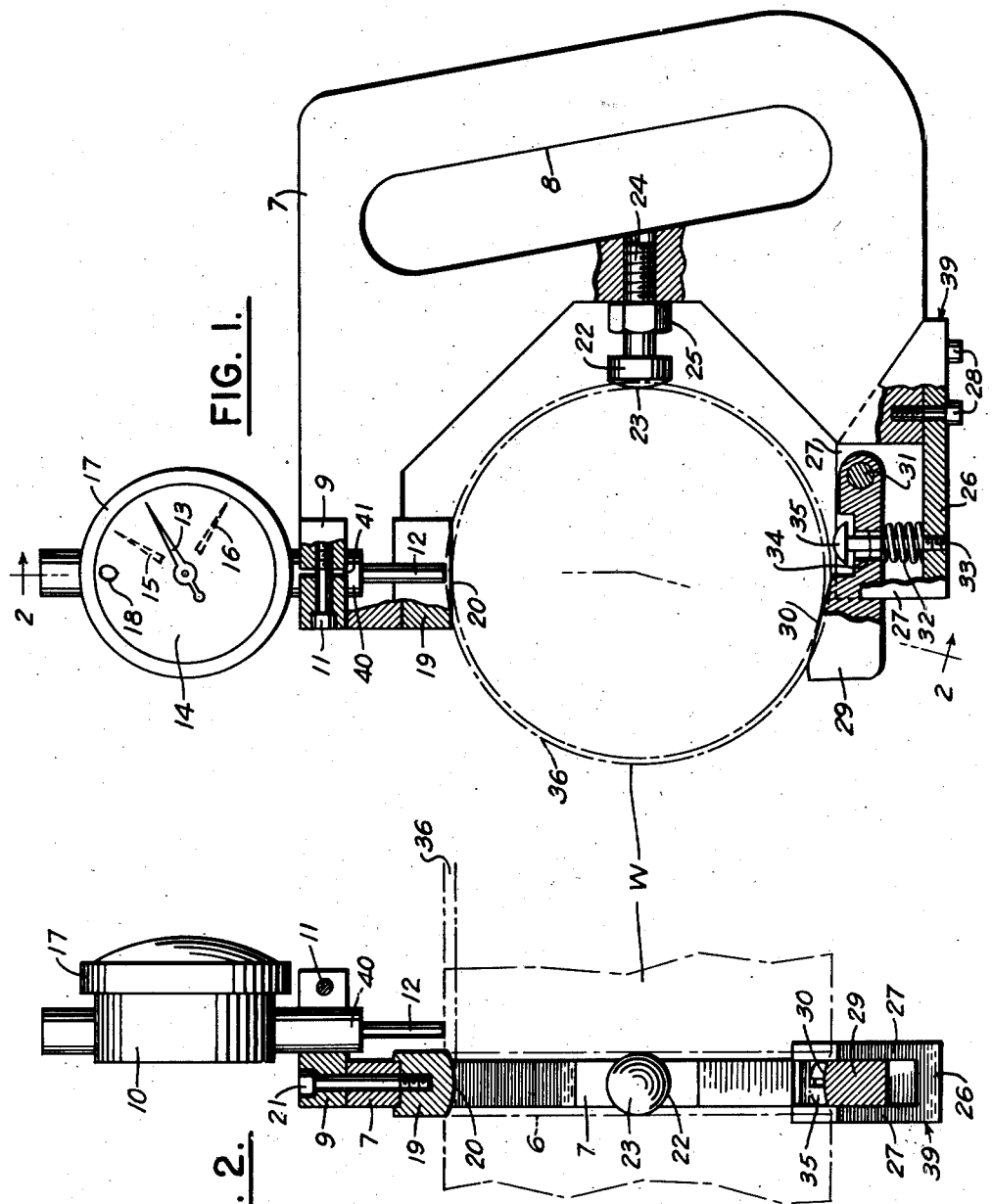
INVENTOR.
JOHN LONGWORTH.
BY
G. J. Kessenich & J. H. Church
ATTORNEYS.

Patented Jan. 1, 1952

2,580,445

UNITED STATES PATENT OFFICE 2,580,445

DEPTH-OF-GROOVE GAUGE

John Longworth, Haddon Heights, N. J.

Application February 24, 1948, Serial No. 10,550

2 Claims. (Cl. 33—147)

(Granted under the act of March 3, 1883, as amended April 30, 1928; 370 O. G. 757)

The invention described in the following specification and claims may be manufactured and used by or for the Government for governmental purposes without the payment to me of any royalty thereon.

This invention relates to gages and has particular reference to a new and useful means for adapting adjustable snap or other gages to the precise measurement of depths of grooves, channels, recesses, and the like, on cylindrical or non-cylindrical members.

One object of my invention is to provide a new and improved means of accurately measuring depths, especially of relatively narrow grooves.

Another object is to provide a depth-of-groove gage which has greater accuracy and can be used more rapidly than old-style gages.

A further object of my invention is to provide a depth-of-groove gage in which the measured dimension is clearly indicated to be within or outside of desirable tolerances and is easily read.

A still further object is to provide a depth-of-groove gage of wide diversity of use and wide range of dimensional adaptability.

In practicing my invention I attain the foregoing and other objects by providing a snap type gage or an adjustable length gage with novel measuring elements in a manner presently to be described.

As an illustrative example of the use of my invention, this specification and the accompanying drawings disclose the application of my invention to an adjustable snap type gage in the measurement of the depth of a circumferential groove 6 in a cylindrical object or work piece W. A typical application of my novel apparatus is in the measurement of the depth of the crimping groove or the groove in which a rotating band is to be seated, both important to the proper manufacture of artillery ammunition. To those skilled in the gage art, it will be obvious that the examples herein described are merely illustrative and that numerous variations of my invention may be made without departing from its inherent spirit and scope.

In the drawings:

Fig. 1 is a side view, in partial section, of my inventive depth-of-groove measuring gage.

Fig. 2 is a section taken along line 2—2 of Fig. 1, looking in the direction shown by the arrows.

Referring to the drawings by reference characters wherein like numbers represent the same part, it will be seen that my gage consists of an essentially C-shaped body or frame 7 of any convenient size and shape and having a suitable slot 8 for handling. Mounted atop and adjacent the upper free end of C-shaped frame 7 and there secured by screws 21 (of which only one is shown) is a block 9 for supporting a dial indicator gage 10 of conventional design. This block 9 is so mounted that a major portion thereof extends out past and perpendicular to one side of the gage frame 7. A hole extends through block 9, the hole's axis being parallel to the side of the gage frame 7. In the drawings this hole is perfectly vertical; it is not identified by a reference character because it is shown completely filled by part of a housing 40 which contains the dial indicator's axially slidable gaging stem 12. As the drawings show, the end of block 9 which is opposite to that attached to the gage body 7 is bifurcated, the two points thereof being separated by a cleft 41 which is continuous internally with the aforementioned hole filled by housing 40. By means of this bifurcation it is possible, with the aid of a screw 11, to cause the separated portions of the block to clamp about housing 40 and support same as illustrated.

The dial indicator's gage stem 12 is so connected to a pointer 13 that a very small axial movement of the stem will cause a comparatively large clockwise or counterclockwise movement of the pointer. The face 14 of the dial indicator is radially graduated (not shown) in a manner suitable to register the amount of axial displacement of the stem 12. In addition to the radial graduations (not shown) there preferably are provided two suitable reference markings 15—16 (which may, if desired, be stationary handset pointers) to designate the allowable variation in the depth to be measured.

As is usual in the art, the face 14 of the dial indicator 10 is secured to a ring 17 by suitable means (not shown) so that by revolving the ring 17 the face 14 also revolves. This condition facilitates setting the dial indicator for use. In setting the dial indicator for use, the stem 12 is allowed to assume its free position of rest, then the ring 17 is released by a clamp (not shown) and revolved, carrying face 14 with it, until the zero graduation 18 on the dial coincides with the pointer 13 in the latter's free position of rest. When so set, the ring 17 is again clamped by well known means (not shown). As will be explained below, during proper use with a piece for which my gage has been previously set, the pointer 13 will assume a position within the scope of the angle of deflection between the two reference markings 15 and 16 or directly over either of the two reference markings. if the depth measured be at or within allowable limits.

A gage block 19 having an arcuate gaging surface 20 is attached to the bottom of the same free end of C-shaped frame 7 which supports the dial indicator 10. This attachment, effected by means of the same screws 21 as hold block 9 fast to body 7. is such that, when the gage is in the vertical position shown by the drawings, a horizontal plane would form a tangent to the mid-point in the arc of gaging surface 20. Under this same condition the longitudinal axis of gage stem 12 would be perpendicular to the same horizontal plane.

Intermediate the two free ends of the essentially C-shaped frame 7 is a stud 24 threaded at one end and on the other end terminating in a button 22 having a suitable arcuate or preferably spherical surface 23. The stud 24 is threadedly secured to the gage frame 7 as shown in Fig. 1 and there secured in position by a lock nut 25. The angular relationship between the axis of gaging stem 12 and the axis of stud 24 preferably is ninety degrees; however, it should be obvious that the stud can be positioned closer to or farther away from stem 12, the only real limitation being that the axis of the stud must be perpendicular to a tangent drawn at the point of contact between the surface 23 of button 22 and the bottom of the groove being gaged in work piece W. It is possible, too, to use more than one button, although each such button must be positioned in accordance with the limitations just described.

At the free end of C-shaped frame 7 opposite to that which supports dial indicator 10 there is fastened by means of screws 28 a U-shaped or channel-like member 39 having a bottom 26 and sides 27. This channel-like member is mounted so that the opening between its sides 27 faces the arcuate surface 20 of gage block 19 on the opposite free end of frame 7. Pivotally supported between the sides 27 of member 39 is a gaging member 29 which has an arcuate gaging surface 30 and is so positioned that this surface 30 faces the opposing gaging surface 20 on gage block 19. The pivot support for member 29 is a pin 31 which extends transversely between and is pressed into the sides 27 of the channel-like member 39.

A coil spring 32 is positioned between gage member 29 and the bottom 26 of member 39, serving constantly to exert a force urging member 29 in the direction of the opposing gage block 19 and thereby applying a clamping pressure which serves to hold the gage and the work piece together. The coil spring is maintained in the described position by a stop screw 33 whose shank passes therethrough and is threadedly attached to the bottom 26 of member 39. The shank of screw 33 also passes through an opening 34 in gage member 29, while the head 35 of the screw serves to limit the distance which member 29 can be pushed away from the bottom 26 of member 39 by spring 32.

As made and assembled the centers of radii on the gage block 19, button 22, and gage member 29 are in precise alignment, as can be seen in Fig. 2. Preferably, the radius of the arcuate gaging surface 20 on gage block 19 is approximately 5% less than the minimum allowable radius of the groove 6 in work piece W to be measured. The radius of the arcuate (or spherical) surface 23 on button 22 and the radius on contact surface 30 of gage member 29 are preferably both approximately 5% more than the radius of the groove 6 on work piece W to be measured. These conditions assure proper seating of my unique and novel depth gage in the work piece groove to be gaged, and eliminate inaccuracies which would result from improper seating. Proper seating of the gage is also enhanced by the constant pressure of gage member 29 against the work piece W, resulting from expansion of coil spring 32.

In preparing my inventive gage for use on a cylindrical work piece W, the gage is first applied in the illustrated manner to a cylindrical master specimen (not shown) having an arcuate circumferential groove of known depth, and the dial indicator gage is adjusted in conventional fashion so that the pointer 13 of the dial indicator will register zero after the master specimen has been removed. In thus standardizing the gage against a master it will be understood that the three gage contact surfaces 20, 23 and 30 all are seated in the master's circumferential groove and the dial indicator' gaging stem 12 rests upon the master's wall surface adjacent the groove (just as represented in the case of the actual work piece W shown by the drawings). It may be necessary, before removing the master specimen, to adjust the button 22 in or out of the frame 7 of the gage until the axis of the master (not shown) intersects a line continuous with the axis of the indicator gage stem 12. This condition can be determined easily by those skilled in the art. When this position is obtained the lock nut 25 is tightened, and the dial indicator is rechecked for correct zero reading. If no further adjustments are necessary, the gage is then ready for use.

The work piece W which is generally just one of a number of almost identical mass-produced work pieces to be gaged (e. g., artillery shells, etc.), is now placed in my gage or, if the work pieces are too unwieldy to move, the gage can be snapped into gaging position without disturbing the work pieces. The depth 36 of the groove 6, which is to be measured, is equal to the perpendicular distance from the surface on the free end of stem 12 (which rests on the work piece) to an imaginary plane parallel thereto and tangent to the arcuate gaging surface 20 on gage block 19 which rests in groove 6. Whether the depth 36 of the groove 6 is within the allowable minimum and maximum limits will be indicated by the rotative position of the pointer 13 of dial indicator 10. If the measured groove is within proper limits, pointer 13 will deflect to a position between reference markings 15—16 (in the drawings the limits are those represented by the lesser angle formed by markings 15—16); if the groove is below the minimum permissible depth, pointer 13 will deflect to a position between the zero reading and reference character 15; and if the groove is more than the maximum permissible depth, pointer 13 will deflect past marking 16.

As will be apparent from an understanding of the foregoing the actual gaging of groove depths is performed by means of gaging block 19 and the dial indicator with its gage stem 12. In fact, by use of these members alone supported by a simple block or bar type of frame, and without utilizing C-shaped frame 7, button 22 or gage member 29, it is also possible to measure the depth of grooves, particularly in non-cylindrical work pieces. However, in the case of cylindrical work pieces the use of three gaging contact surfaces as herein described and illustrated is highly valuable if not essential in order to get accurate readings, especially to get such readings at different points around the circumference of the groove. The use of three such contact surfaces (20, 23 and 30) serves constantly to keep gaging surface 20 properly seated upon the circumference formed by the very bottom of the groove being measured and, as either the work piece or the gage is moved circumferentially with respect to the other, the auxiliary contact surfaces 23 and 30 serve to prevent gaging surface 20 from slipping out of its proper gaging position.

It will be obvious to anyone of average skill in this art that my novel device can be modified in numerous ways without departing from the spirit and intent of the invention. For example, gaging blocks, buttons or other members of different dimensions may be employed where it is desired to measure grooves of different widths and depths; or, it may be desired to gage grooves on cylindrical work pieces having greater or lesser diameters than the illustrated work piece, in which case the present gaging members could be readjusted or the entire gage could be made larger or smaller as the case may require. A further modification could be the use of a gage other than the dial indicator type as, for example, a calibrated rod which could be an extension of gage stem 12 whereby the depth of groove could be read in terms of the amount of the non-gaging end position of the rod which extends beyond a supporting housing therefor.

From the foregoing, however, it will be clear that I have provided a new and improved means of accurately measuring depths, especially of relatively narrow grooves; that I have provided a depth-of-groove gage which can be used more rapidly than old style gages; that I have provided a depth-of-groove gage in which the measured dimension is clearly indicated to be within or outside of desirable tolerances and is easily read; and that I have provided a depth-of-groove gage of wide diversity of use and wide range of dimensional adaptability.

My inventive improvements are therefore extensive in their adaption and are not to be restricted to the specific form here disclosed by way of illustration.

I claim:
1. The combination in a snap gage for measuring the depth of a circumferential groove in a cylindrical work piece comprising, a substantially C-shaped frame having opposed first and second free ends, a first non-yielding work engaging member extending from the first end of said frame to contact the bottom of the groove being measured, a yielding work engaging member resiliently mounted on the second end of said frame to contact the bottom of the groove being measured and give clamping support for holding gage and workpiece together, an indicating device mounted on the frame's first end spaced from said first non-yielding work engaging member and having a gaging stem which contacts the surface of the work adjacent the top of the groove being measured and is movable relative to said frame along a line parallel to the side of said frame and said first work engaging member, and a second non-yielding work engaging member threadedly attached to and extending from said frame intermediate the first and second free ends for making contact with the bottom of the groove being measured and adjustable to permit placement of the work relative to the gage so that the axis of the work piece intersects a line continuous with the axis of said indicating device's gaging stem.

2. A device of the character described for measuring the depth of a groove in a cylindrical work piece having, in combination, a substantially C-shaped frame with first and second arms separated from one another to provide an aperture for supporting work pieces between opposing faces of the arms, a primary work engaging member extending from the free end of said first arm and adapted to contact the bottom of the groove being measured, at least one secondary work engaging member extending from said frame intermediate said two arms and likewise adapted to contact the bottom of the groove being measured, an extension projecting laterally from a side of said first arm and perpendicular to a side of said primary work engaging member, an indicating gage mounted on said lateral extension, and a gaging stem carried by said indicating gage and movable relative thereto along a line perpendicular to a side of said lateral extension, the extent of stem movement being readable on said indicating gage.

JOHN LONGWORTH.

REFERENCES CITED

The following references are of record in the file of this patent:

UNITED STATES PATENTS

| Number | Name | Date |
| --- | --- | --- |
| 1,357,813 | Olson | Nov. 2, 1920 |
| 1,541,796 | Darlington | June 16, 1925 |
| 1,597,636 | Sykes | Aug. 24, 1926 |
| 1,617,005 | Ames | Feb. 8, 1927 |
| 1,949,014 | Gleason et al. | Feb. 27, 1934 |
| 2,399,012 | Farrance | Apr. 23, 1946 |
| 2,419,433 | Aller | Apr. 22, 1947 |